United States Patent [19]

Yamada et al.

[11] Patent Number: 5,296,510

[45] Date of Patent: Mar. 22, 1994

[54] METHOD FOR TREATING THE SURFACE OF A THIN POROUS FILM MATERIAL OF TETRAFLUOROETHYLENE RESIN

[75] Inventors: Katsuya Yamada; Koichi Okita; Shin-ichi Toyo-oka; Shigeru Asako, all of Osaka, Japan

[73] Assignee: Sumitomo Electric Industries Ltd., Osaka, Japan

[21] Appl. No.: 515,778

[22] Filed: Apr. 26, 1990

Related U.S. Application Data

[63] Continuation of Ser. No. 811,805, Dec. 20, 1985, abandoned.

[30] Foreign Application Priority Data

Dec. 25, 1984 [JP] Japan .................................. 59-279281

[51] Int. Cl.$^5$ .............................................. C08J 9/38
[52] U.S. Cl. ................................... 521/145; 521/77; 521/918; 528/481; 528/503; 156/82; 522/2; 264/22; 264/80
[58] Field of Search .............. 528/481, 503; 427/223, 427/224; 156/82; 264/80, 22; 521/77, 145; 522/2

[56] References Cited

U.S. PATENT DOCUMENTS

| | | | |
|---|---|---|---|
| 2,396,629 | 3/1946 | Alfthan et al. | 264/345 |
| 3,153,684 | 10/1964 | Bryan et al. | 264/80 |
| 3,309,221 | 3/1967 | Smith et al. | 264/22 X |
| 3,811,987 | 5/1974 | Wilkinson et al. | 156/82 X |
| 3,900,538 | 8/1975 | Kawakami et al. | 264/80 X |
| 3,953,566 | 4/1976 | Gore | 428/422 X |
| 3,957,938 | 5/1976 | Gravley | 264/345 X |
| 4,049,589 | 9/1977 | Sakane | 264/345 X |
| 4,193,138 | 3/1980 | Okita | 427/2 X |
| 4,283,448 | 8/1981 | Bowman | 156/86 X |
| 4,557,955 | 12/1985 | Walch et al. | 264/48 X |
| 4,596,837 | 6/1986 | Yamamoto et al. | 521/145 |
| 4,702,956 | 10/1987 | Wilson et al. | 156/82 X |

OTHER PUBLICATIONS

*Chem. Eng's Hndbk*, J. Perry (ed.) McGraw-Hill Co., Inc. N.Y., N.Y. (1950) p. 1589.

*Primary Examiner*—Fred Teskin
*Attorney, Agent, or Firm*—Sughrue, Mion, Zinn, Macpeak & Seas

[57] ABSTRACT

A method for treating the surface of a thin porous film material of tetrafluoroethylene resin is disclosed, which comprises heating said surface to a temperature higher than the thermal decomposition point of said resin so as to decompose and remove part of said surface. The resulting thin porous film material of tetrafluoroethylene resin has an adhesive surface while retaining the desired pore size, hardness, and degree of penetration of adhesive.

19 Claims, No Drawings

METHOD FOR TREATING THE SURFACE OF A THIN POROUS FILM MATERIAL OF TETRAFLUOROETHYLENE RESIN

This is a continuation of application Ser. No. 06/811,805 filed Dec. 20, 1985, now abandoned.

FIELD OF THE INVENTION

The present invention relates to a method for treating the surface of a thin porous film material of tetrafluoroethylene resin by heating said surface to a temperature higher than the thermal decomposition point of the tetrafluoroethylene resin so as to decompose and remove part of said surface.

BACKGROUND OF THE INVENTION

Tetrafluoroethylene resins are highly resistant to heat and chemicals, have high electrical insulating properties, provide high water repellency and provide good biocompatibility. Because of these advantages, porous materials of tetrafluoroethylene resins are extensively used in filters, diaphragms, waterproof but airpermeable materials, electrical coatings, sealants, medical equipment and artificial organs. While several methods have been proposed as techniques for producing porous materials of tetrafluoroethylene resin.

The basic principles of a method depending on drawing operations are described in Japanese Patent Publication No. 13560/1967. The first step consists of mixing a powder of tetrafluoroethylene resin with a liquid lubricant and shaping the mixture into a unfired film, tube, or rod by paste extrusion, calender rolling, or a combination of these two methods. The subsequent steps comprises (1) removing the liquid lubricant by evaporation or extraction, (2) drawing the dry shaped product to make it porous, and (3) firing the porous product to a temperature higher than the melting point of the tetrafluoroethylene resin so as to set the porous structure.

A method for producing a porous material of tetrafluoroethylene resin described in U.S. Pat. No. 3,527,616 is as follows. A mixture of a polytetrafluoroethylene dispersion and polymethylmethacrylate is kneaded with preheated rolls, and then injection molded. The product obtained is subjected to a compression molding under heating, and thereafter polymethylmethacrylate is extracted with acetone, as a result, a porous material of tetrafluoroethylene resin is obtained.

Another method for producing a porous material of tetrafluoroethylene resin is described in Japanese Patent Application (OPI) No. 56578/73 (the term "OPI" used herein means a "published unexamined Japanese patent application"). In this method, a polytetrafluoroethylene hydrophilic dspersion is mixed with a fine powdered filler and a pore forming agent, and then molded in a thin film. The product is subjected to a heat treatment, and thereafter the pore forming agent is removed by solvent extraction, as a result, a porous material of tetrafluoroethylene resin is obtained.

Among the above methods, the method depending on drawing operation is preferred because this method is good in pore size uniformity and strength of the product and productivity. However, in the present invention there is no limitation on the methods for producing a porous material of tetrafluoroethylene resin.

The structure of the porous material prepared by this process may vary by some degree, depending upon the draw ratio or other drawing conditions such as temperature and speed, but it basically has a fibrous structure wherein nodes are interconnected by small filaments, providing pores in areas bounded by the filaments and nodes. Generally, by increasing the draw ratio, the filaments are made longer and the nodes smaller, with the result that the proportion of pores or the porosity, is increased.

One serious problem with the thin porous material of tetrafluoroethylene resin prepared by the conventional method is that it has low adhesive properties, which is an inherent defect of tetrafluoroethylene resins.

Tetrafluoroethylene resins have such a high resistance to chemicals and solvents that they are not all reactive with acids, alkalis, or organic solvents. The only substances that are capable of attacking tetrafluoroethylene resins are molten alkali metals, certain solutions of alkali metals, and hot fluorine and chlorine trifluoride. Therefore, one method available today for modifying the surface of materials of tetrafluoroethylene resins so that they can be bonded to other resins is to treat them with an ammonia solution of metallic sodium. For example, U.S. Pat. No. 3,632,387 discloses a method for modifying the surface of materials of tetrafluoroethylene resins by using an ether solution of sodium naphthalate or an ammonia solution of metallic potassium.

Another approach that can be taken consists of drawing a porous material of tetrafluoroethylene resin at a high draw ratio so as to form pores that are large enough to provide anchorage effects to enable physical adhesion.

A porous polytetrafluoroethylene has some adhesive property compared with a non-porous one. A low viscosity resin can penetrate the pores, and generate the anchorage effect. In the case of a porous polytetrafluoroethylene having a high porosity and a large pore diameter due to a high drawing ratio, a resin or a resin solution can penetrate the pore easily. Thus the anchorage effects are increased and the adhesive property is improved.

However, this method, which requires an increase in the overall porosity, and involves great difficulty in producing a porous material having the desired pore size. Further problems arise from the high flexibility of the product, the thin porous material may deform in the bonding step, or the adhesive used will penetrate into the material to an undesirably deep portion. For example, a plurality of tetrafluoroethylene tubes for filter use that have been rendered sufficiently porous to provide adequate adhesive properties cannot be fixed at both ends of each tube with a resin adhesive without collapsing the portions to be bonded during handling, or letting the adhesive penetrate through the walls of tubes to block the interior.

As mentioned above, a thin porous film material made of a tetrafluoroethylene resin can be provided with an increased flexibility and higher degree of bendability by drawing the material at a sufficiently high draw ratio to provide a higher porosity, but at the same time, a tube made of such material tends to easily collapse into a flat form. Methods for avoiding this problem are described in U.S. Pat. Nos. 4,304,010 and 4,306,318, a tubular thin porous film material is drawn at a given ratio and fired, and after inserting a cylindrical metal member through the tube, the latter is heated in a radiant furnace until the outer surface of the tube becomes over-sintered. However, this is not industrially advantageous, since it involves great difficulty in treating the surface of an elongated article in a continuous fashion.

SUMMARY OF THE INVENTION

One object, therefore, of the present invention is to overcome the problems described above, and according to the present invention, part of the surface of a thin porous film material made of a tetrafluoroethylene resin is removed by heating said surface to a temperature higher than the thermal decomposition point of the tetrafluoroethylene resin. By this method, the thin porous film material is provided with an adhesive surface while permitting the film material to retain the desired pore size, hardness, and degree of penetration of an adhesive.

Another object of the present invention is to improve the bendability of a tubular thin porous film material. In accordance with the present invention continuous surface treatment of an elongated article can be realized while ensuring high bendability without causing any practical problems.

A further object of the present invention concerns a tubular thin film material with asymmetric pore diameters wherein the fibrous structure of a tetrafluoroethylene resin of which said material is made continuously varies through said tubular thin porous film material so as to provide the outer and inner surface of the tube with different structures. The present invention enables the pore sizes in said material to be freely controlled by heating its surface to a temperature higher than the thermal decomposition point of the tetrafluoroethylene resin so as to decompose and remove part of the surface by a desired thickness. Further, in accordance with the present invention, the pore size in the tubular thin porous film material can be varied with high precision in the longitudinal direction of the tube.

The present inventors have made extensive studies on techniques for treating the surface of a thin porous film material that has been prepared by rolling or paste-extruding tetrafluoroethylene resin with a liquid lubricant into a thin film that is subsequently dried, drawn, and fired. As a result, the inventors have found that a thin porous film material having improved adhesive and bending properties can be obtained by heating the surface of the resin to a temperature higher than its thermal decomposition temperature so as to decompose and remove part of said surface. The inventors have also found that this method enables control of pore sizes in the material. The present invention has been accomplished on the basis of these findings.

DETAILED DESCRIPTION OF THE INVENTION

A thin porous film material made of a tetrafluoroethylene resin having high resistance to heat and chemicals, good electrical insulating properties, high water repellency and good biocompatibility can be provided with improved adhesive properties by treating its surface in accordance with the method of the present invention. The thus-treated material can be easily assembled into an apparatus that is capable of precise and large-volume filtration, concentration or separating operations on an industrial scale. The material is therefore useful in industrial fields where no economic advantages have been found in using the prior thin porous film materials because of the need for bulk processing.

The material treated by the method of the present invention that exhibits the features of good biocompatibility, good adhesive properties, high flexibility and structural anisotropy can also be used advantageously in medical fields by incorporation in membranes for separating blood corpuscles, artificial organs (e.g., artificial lung, kidney, and blood vessels), and medical equipment (e.g., catheters). Furthermore, the material treated in accordance with the present invention can be used for office equipments advantageously such as an oil feeder of a copy machine which is capable of feeding silicone oil quantitatively and preventing the adhesion of toner.

The method of the present invention is applicable to thin porous film materials of tetrafluoroethylene resin whether they are in a sheet, rod or tubular form.

When the surface of the thin porous film material of tetrafluoroethylene resin is heated to a temperature higher than the thermal decomposition point of the resin, the material is decomposed to undergo evaporation from the surface toward the interior. The thinnest filaments in the resin are the first to be decomposed and evaporated, and the thicker filaments and nodes are decomposed at a later stage, thereby providing roughened areas in the outermost layer where the apparent pore sizes are greater than those in the interior of the resin. The degree of surface roughening, reflected in the pore sizes in the outermost layer and the depth of the roughened surface, can be adjusted by varying the temperature or duration of heating. It is particularly preferred that heating is conducted for a short period at a higher temperature because by shortening the heating period, the amount of heat transmitted to the inside of the thin porous film material is reduced and only part of its surface can be roughened without causing any change in the interior porous structure. As a result, the thin porous film material is provided with an adhesive surface while retaining the desired pore size, hardness, and degree of penetration of the adhesive.

The effects of the present invention are characterized by that the only the surface of the thin film material of tetrafluoroethylene resin can be treated that results in the anchorage effect. As the result, the improvement in the adhesion property can be attained without the deterioration of the porosities of the whole material such as the pore diameters and the hardness. Although the oxidized layer may be formed on the surface of the material by the treatment according to the present invention which can improve the adhesion property, the principal contribution for the improvement in adhesion property is attained by the anchorage effect.

In treating the tubular thin porous film material, since the thicker filaments and nodes in the resin are decomposed and evaporated later than the fine filaments, not only is the bendability of the thin porous film material improved but also the strength of the material in the radial direction is maintained sufficiently to avoid the chance of the tubular form thereof being collapsed into a flat form.

If the thin porous film material to be treated is a tubular material with asymmetric pore diameters, the pore sizes in the material can be controlled by adjusting the depth of the surface layer to be treated. In the tubular thin film material with asymmetric pore diameters, the outer surface contains shorter filaments while the inner surface comprises longer filaments, thereby providing a smaller average pore size in the area closer to the outer surface and a larger average size in the area closer to the inner surface. Therefore, a smaller average pore size can be obtained by treating the outer surface of the tube to a small depth, while a greater average pore size can be realized by treating to a deeper area.

The term "thermal decomposition point" of tetrafluoroethylene resin used in the present invention means the temperature at which the tetrafluoroethylene resin being heated at an atmospheric pressure undergoes an appreciable loss in weight. The thermal decomposition point depends on period of time for which heat treatment carried out. In one sense, 260° C. may be considered as a thermal decomposition temperature, since the weight of the resin gradually dereases if it is exposed to this temperature for a prolonged period. However, for the purposes of the present invention, 260° C. should not be included in the meaning of the "thermal decomposition point" of the tetrafluoroethylene resin.

Although there is observed no transition point for the decrease in resin weight, decomposition and an appreciable loss in the weight of the resin generally occurs for the first time at a temperature above 400° C., and preferably in the range of about from 400° to 500° C. For the convenience's sake, the thermal decomposition point of the tetrafluoroethylene resin constituting the thin porous film material to be treated by the present invention may be assumed to be within this temperature range, but is not limited to this range.

Any heating method may be employed and illustrative examples include the use of radiation furnaces, the use of metal rolls or a salt bath, the use of hot air, the use of a flame from a gas burner, and the use of a laser beam. Hot air, a flame, and a laser beam are advantageously used because they are easy to control. In the first case, for example, hot air at from 600° to 700° C. may be supplied by feeding air into a heater with a fan. In the second case, where a flame is used, its temperature may be controlled by, for example, mixing a flammable gas, e.g., propane gas, etc., with air having an increased oxygen concentration. In the third case, a $CO_2$ gas laser may be used with advantage.

The heating period will vary with the depth of the surface layer to be treated, the density of the area to be treated of the shaped porous thin film, the heating temperature, and the specific heating means used. A longer heting period is required if a deep area of the surface layer, or a thick film must be treated, or if the area to be treated of the shaped thin porous film has high density. On the other hand, a shorer heating period should be selected if the heating temperature is high or if the beating element used has a large specific heat. As a guide, the heating period should preferably be limited to 30 seconds or less if air hotter than 600° C. is used, and a period of 1 second or less is preferably selected if a $CO_2$ gas laser or a flame is used.

The following examples are provided for further illustrating the advantages of the present invention but should not be taken as limiting its scope.

EXAMPLE 1

A porous tetrafluoroethylene resin tube (outside diameter: 0.9 mm, inside diameter: 0.2 mm, porosity: 33%) was found to have a bubble point of 1.54 $kg/cm^2$. The "bubble point" is the pressure at which air bubbles are evolved when the interior of the tube is pressurized with air in isopropyl alcohol, and this pressure is a measure of maximum pore size. The tube was found to be capable of bonding to silicone rubber at a strength of 1.5 $kg/cm^2$.

The porous tetrafluoroethylene resin tube was transported at a linear speed of 5 m/min for treating its surface by exposure to the tip of the flame from a gas burner issuing a mixture of propane gas (32%) oxygen (54%) and air (14%).

The thus-treated tube experienced little change in the outside diameter, inside diameter, or porosity, but its bubble point was reduced to 0.65 $kg/cm^2$, and the strength of adhesion to silicone rubber increased to 5.4 $kg/cm^2$.

EXAMPLE 2

The procedures of Example 1 were repeated except that the tube was transported at a linear speed of 10 m/min. during the heat treatment. The thus-treated tube experienced little change in the outside diameter, inside diameter and porosity, but its bubble point was reduce to 0.92 $kg/cm^2$ and the strength of adhesion to silicone rubber increased to 2.8 $kg/cm^2$.

COMPARATIVE EXAMPLE 1

Two porous tetrafluoroethylene resin tubes respectively having bubble points of 0.92 $kg/cm^2$ and 0.65 $kg/cm^2$ were found to adhere to silicone rubber at strengths of 1.5 $kg/cm^2$ and 2.3 $kg/cm^2$ respectively, when they were not subjected to heat treatment in accordance with the present invention.

EXAMPLE 3

A porous tetrafluoroethylene resin tube (outside diameter: 1.1 mm, inside diameter: 0.3 mm, porosity: 35%) was found to adhere to silicone rubber at a strength of 1.8 $kg/cm^2$. This tube was transported at a linear speed of 5 m/min as it was irradiated with $CO_2$ gas laser beam at a power density of 5.75 $W/mm^2$. The thus-treated tube had an adhesive strength to silicone rubber of 5.6 $kg/cm^2$.

EXAMPLE 4

A tetrafluoroethylene resin tube with asymmetric pore diameters (outside diameter: 1.1 mm, inside diameter: 0.45 mm, porosity: 31%, bubble point: 2.5 $kg/cm^2$) was internally pressurized with water, but no water leakage occurred even at 6 $kg/cm^2$. After treating part of the tube surface with hot air (ca. 700° C.) for 6 seconds, the tube was subjected to internal hydraulic water pressure. At a pressure of about 3 $kg/cm^2$, tiny drops of water gradually leaked out of the treated area of the tube. After cutting off the treated area, another portion of the tube was treated with hot air (ca. 700° C.) for 15 seconds and hydraulic pressure was internally exerted on the tube. At a pressure of about 1 $kg/cm^2$, water drops began to leak out of the treated portion.

A thin porous film material made of a tetrafluoroethylene resin having high resistance to heat and chemicals, good electrical insulating properties and high biocompatibility can be provided with improved adhesive properties by treating its surface in accordance with the method of the present invention. Because of such improved adhesive properties, the thus-treated material can be easily assembled into an apparatus that is capable of large-volume processing and which will find expanded utility in industry. The material treated by the method of the present invention, exhibiting the features of not only high biocompatibility, but also good adhesive properties, high flexibility, and structural anisotropy, can also be used advantageously in medical fields by use for plasma separation membranes, artificial organs such as artificial kidney, artificial lung, and artificial blood vessels, and medical equipment such as catheters. Furthermore, the material treated in accordance with the present invention can be used for office equipment advantageously such as an oil feeder of a copy machine which is capable of feeding silicone oil quantitatively and preventing the adhesion of toner.

While the invention has been described in detail and with reference to specific embodiments thereof, it will be a parent to one skilled in the art that various changes and modifications can be made therein without departing from the spirit and scope thereof.

What is claimed is:

1. A method for enhancing the bending properties of a tubular thin porous film material of tetrafluoroethylene resin, comprising treating the surface of said tubular thin porous film material by heating said surface to a temperature of about 400° C. or more in a controlled manner effective to decompose and remove a desired part of said surface, thus providing the tubular thin porous film material with a roughened surface over an area effective to enhance the bending properties of the material while maintaining the strength of the material in the radial direction.

2. A method according to claim 1, wherein said tubular thin porous film material has a fibrous structure comprising nodes interconnected by filaments, said tubular thin porous film material having asymmetric pore diameters in that the fibrous structure varies continuously through said tubular thin porous film material so as to provide the outer and inner surfaces of the tube with different average pore sizes.

3. A method according to claim 1, wherein the heating source is hot air, a flame, or a $CO_2$ gas laser.

4. A method according to claim 3, wherein the heating source is hot air at a temperature of from 600° C. to 700° C.

5. A method according to claim 4, wherein the heating period is 30 seconds or less.

6. A method according to claim 3, wherein the heating source is a flame formed by mixing a flammable gas with air having an increased oxygen concentration.

7. A method according to claim 6, wherein the heating period is one second or less.

8. A method according to claim 3, wherein the heating source is a $CO_2$ gas laser.

9. A method according to claim 8, wherein the heating period is one second or less.

10. A tubular thin porous film material of tetrafluoroethylene resin, which has been treated by heating the surface thereof to a temperature of about 400° C. or more in a controlled manner effective to decompose and remove a desired part of said surface, thus providing the tubular thin porous film material with a roughened surface over an area effective to enhance the bending properties of the material while maintaining the strength of the material in the radial direction.

11. A method for controlling pore size of a thin porous film material of tetrafluoroethylene resin with high precision, comprising treating the surface of said thin porous film material by heating said surface to a temperature of about 400° C. or more in a controlled manner effective to decompose and remove a desired part of said surface to give a desired film thickness, and consequently pore size, over the surface of the material, said pore size being variable at different locations on said surface by controlling the temperature and/or duration of said heating at said different locations in a manner effective to give the desired pore size at said locations.

12. A method according to claim 11, wherein said thin porous film material of tetrafluoroethylene resin is a tubular thin porous film material having a fibrous structure comprising nodes interconnected by filaments, said tubular thin porous film material having asymmetric pore diameters in that the fibrous structure varies continuously through said tubular thin porous film material so as to provide the outer and inner surfaces of the tube with different average pore sizes.

13. A method according to claim 11, wherein the heating source is hot air, a flame, or a $CO_2$ gas laser.

14. A method according to claim 13, wherein the heating source is hot air at a temperature of from 600° C. to 700° C.

15. A method according to claim 14, wherein the heating period is 30 seconds or less.

16. A method according to claim 13, wherein the heating source is a flame formed by mixing a flammable gas with air having an increased oxygen concentration.

17. A method according to claim 16, wherein the heating period is one second or less.

18. A method according to claim 13, wherein the heating source is a $CO_2$ gas laser.

19. A method according to claim 18, wherein the heating period is one second or less.

* * * * *